Dec. 6, 1966  K. L. ORSER  3,290,420
PROCESS FOR MAKING THIN ORIENTED PLASTIC STRIPS AND TAPE
Filed July 5, 1962
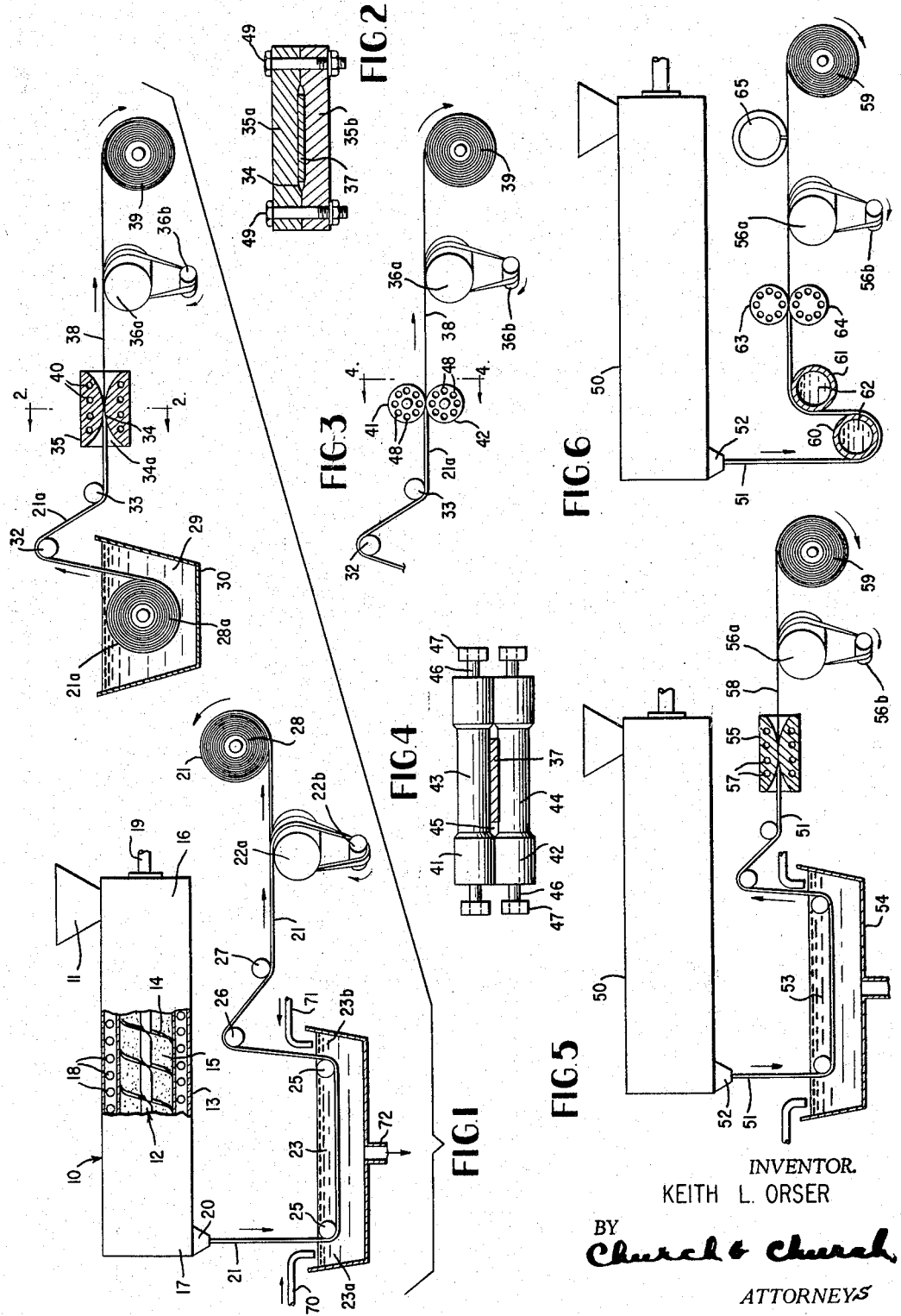
INVENTOR.
KEITH L. ORSER
BY
Church & Church,
ATTORNEYS United States Patent Office 3,290,420
Patented Dec. 6, 1966

3,290,420
PROCESS FOR MAKING THIN ORIENTED
PLASTIC STRIPS AND TAPE
Keith L. Orser, Auburn, N.Y., assignor to Columbian
Rope Company, Auburn, N.Y., a corporation of New
York
Filed July 5, 1962, Ser. No. 207,718
8 Claims. (Cl. 264—210)

This invention relates to a method for making thin, oriented strips of polymeric material having a high degree of strength transverse to the direction in which the stretching, orientation force is applied and to methods and apparatus for fabricating the oriented strips. It is particularly adapted to a thin, high strength, tape of oriented polymeric material for strapping and packaging.

Various polymeric materials, such as nylon, dacron, linear polyethylene and its copolymers, polypropylene, etc., can be oriented; i.e., the long chain like molecules of these materials are aligned generally in one direction with the result that the tensile strength of the material in the direction of alignment is much greater than the same material in an unoriented condition. This phenomenon and methods of orienting filaments, ribbons, sheets, etc., of these orientable materials are well known in the art. Briefly, it involves heat treating a shaped length of an orientable material to place the material in a condition in which the unoriented crystals are in an optimum condition for being oriented and then subjecting the shaped length to a stretching force which permanently elongates the length and orients the molecular arrangement in the stretching direction.

The shaped length to be oriented can be conveniently formed to the desired shape for being oriented by extruding molten plastic material through an orifice. Since the material being extruded is in a non-crystalline, plastic state, any hot drawing operation performed on the length as it is extruded produces little or essentially no orientation of the material in the extrusion. Prior to being stretched, the hot extruded length is cooled to a temperature at which crystallites form in the material, sometimes referred to as crystallization of the material. Aggregates of the long molecules of the orientable polymers will form as crystallites or "elemental fibers" when the material is cooled sufficiently below its melting point. According to the "fringed micelle concept," these crystallites are composed of aggregates of long molecules, which are generally parallel within the crystallite. The molecules are interlocked and some of them extend through more than one crystallite. The aggregates of long molecules or portions of molecules comprising the crystallites are probably much longer than wide and the long axes of these crystallites are randomly arranged in the unoriented material.

If a stretching force is applied to a segment of an orientable polymeric material, which is in the crystalline condition discussed above, the crystallites will slide relatively to each other so that the previously randomly arranged longitudinal axes are more or less parallel to each other and aligned in the direction of the stretching force. This results in the material undergoing a permanent and non-reversible extension and produces a marked increase in the tensile strength of the material in the direction of stretching. This stretching operation in which the material is freely drawn by applying a stretching force is commonly known as orientation drawing or cold drawing. The amount of force required to pull a segment of unoriented material and stretch it to an oriented condition is not great and is substantially constant. However, once the length of material is drawn to a fully oriented condition, the resistance to being further stretched rises markedly. Once a length is in the fully oriented condition it cannot be further elongated and increasing the pulling force only results in breaking the material.

When a length of undrawn, orientable material is freely drawn to a fully stretched and oriented condition it will elongate an amount controlled by the natural draw ratio of the material which is primarily a function of the material and its condition. The natural draw ratio is a function of the material, the prior history of that material particularly as relates to the form and degree of crystallization present in the material, the temperature of the material at the time of orientation draw, and, to a lesser extent, the drawing speed. The drawing speed is the rate at which fully drawn material moves relative to the drawing neck.

The natural draw ratio is an inherent characteristic of an orientable polymeric material in a given crystalline state, other factors affecting the draw ratio being constant (temperature and drawing speed being the primary factors). The natural draw ratio may be defined as the ratio of maximum, permanent, non-reversible extension which is given an orientable material in being changed from an undrawn state to a uniformly drawn and highly oriented state by freely drawing and stretching the material without straining it so as to produce cracks or failures. In other words, it is the ratio of the stretched length of a segment of orientable material, which has been extended by applying a stretching force until a marked increase in resistance to further stretching occurs, to the length immediately prior to being stretched, or the ratio between cross sectional areas before and after the stretching operation.

When a synthetic orientable polymer, which is not in a plastic flowable condition due to its high temperature or the presence of plasticizers, is pulled by a stretching force it will tend to draw at its natural draw ratio and become highly oriented. An undrawn orientable polymer will tend to draw at its natural draw ratio if a stretching force is applied. In other words, if the natural draw ratio for a particular material is 5, the material cannot be fully orientation drawn by free drawing to either 4 or 6 times its length. If an attempt is made to exceed the draw ratio of 5, the material will crack or rupture. If an attempt is made to limit the draw ratio to 4 times the original length, a portion of the material will be drawn at the natural draw ratio of 5 and the remainder will remain in an undrawn state. Therefore, if a length of undrawn material of a given cross section is fully stretched at its natural draw ratio to an oriented condition, the material will always neck down to the same final reduced cross section, and of course, the same degree of elongation will always occur, provided that the factors affecting the draw ratio are constant. Thus, if lengths are cut from a homogeneous strip of material and these lengths are stretched under similar conditions to the point where their resistance to further stretching markedly increases, the lengths will permanently deform to the same width and thickness.

Although the processes for orienting different materials for different purposes may vary in details, a simple basic stretching operation is the key step in the orientation process. A shaped length of the polymeric material in a crystalline, unoriented condition, after having been brought to an optimum temperature for orienting the crystals, is subjected to a stretching force which will freely stretch the material and cause the crystallites to assume an oriented condition. In this free stretching process the material is freely drawn at its natural draw ratio and will assume the final dimensions inherent to that natural draw ratio. This stretching force can be applied in various ways, a common method being to wind at least several turns of an undrawn, extruded length of the material around slowly rotating feed rollers. A free end of the material is led from the slow feed rollers to more rapidly rotating pulling rollers which are positioned at some distance from the feed rollers, and the free end is wound around the rapidly rotating pulling rollers. The difference in velocity between the rollers will draw and stretch the length of material lying between the rollers. In order to orient fully all of the material passing through the rollers, the relative speed of the rollers must be adjusted so that the plastic strip is fully stretched at its natural draw ratio without applying an excessive force to break the material. This is not difficult to control inasmuch as the undrawn plastic material requires little force to stretch it to the fully drawn state at which point the fully drawn material strongly resists further stretching; therefore an adjustable speed arrangement for one or both of the two sets of rollers will produce satisfactory results.

When flat shapes of oriented material are produced by the previously discussed stretching process, certain undesirable characteristics are present in the final product. First, the oriented material has low lateral strength, has poor resistance to abrasion, and tends to become fibrillated so that cracks appear in the material along the direction of draw. A tape which has been oriented by being drawn in the direction of its length has a tendency to form longitudinal cracks when the tape is subjected to forces which are lateral to its width. For example the tape will fibrillate if folded along a diagonal line or is punctured. This same tape has poor abrasive qualities, i.e., the longitudinal fibers in the tape are easily raised by abrasive action on the tape surface. To overcome this deficiency of low strength transverse to the drawing direction in sheets of oriented material, orientation drawing forces are applied to the sheet in two directions, essentially perpendicular to each other. However, this practice is not particularly practical for fabricating tapes where the length to width ratio is very high and the dual drawing process of sheets introduces obvious complications.

A second difficulty encountered in producing thin lengths of oriented material results from the fact that the physical dimensions of the oriented material, as finally drawn, are controlled by their natural draw ratio, i.e. the material tends to assume certain natural dimensions after being freely drawn. Therefore, it has been found to be extremely difficult to produce highly oriented strips of maximum tensile strength which have certain cross sectional dimensions. The cross sectional dimensions of an oriented tape produced by free drawing are a function of the cross sectional dimensions of the undrawn and unoriented extrudate of which the cross sectional dimensions are controlled by the extruder die size and the amount of drawdown or hot stretching as the extrudate leaves the die. Since the amount of hot draw afforded the extrudate is a factor affecting the orientability of the material, the available range of hot drawing for controlling extrudate size is very limited and, furthermore, the dimensions resulting from drawdown are not always predictable. Although the control of extrudate is best accomplished by die size control, this involves considerable trial and error, even with considerable experience unless an adjustable die is available. Adjustable dies are very expensive. Accordingly, the production of a freely drawn oriented tape of a specific size may involve a great deal of expensive experimentation in freely drawing extrudates produced from dies of many sizes.

As a specific example, a number of unsuccessful efforts were made to produce a highly oriented tape of polymeric material of essentially maximum attainable tensile strength and measuring 0.5 inch wide and 0.016 inch thick by freely drawing extruded lengths. For reasons of practical design, a high tensile strength plastic tape of these dimensions was desired for use in strapping containers or bales. Extrudates of unoriented material of dimensions which would freely draw to a 0.5 inch wide oriented tape would not be .016 inch thick. When the thickness of the extrudate would be varied, the drawn tape would not be 0.5 inch wide, etc. Thus it appears that the ratio of 500 to 16 is not a ratio of width to thickness to which a number of orientable materials, specifically including linear polyethylene and polypropylene, can be readily freely drawn to a highly oriented condition without extensive and expensive research.

The oriented polymeric plastics have excellent strength characteristics and other obvious advantages which would make them most useful in applications where a high degree of tensile strength is required, particularly when a material is required which is flexible, will absorb a moderate degree of energy, and is highly resistant to weathering. However, the poor lateral strength characteristics of strips of oriented polymer plastics makes wide, thin lengths of highly oriented plastics unsuitable for many purposes as they easily abrade and longitudinal cracks form in the strips when it is subjected to transverse forces under practical conditions of usage. Likewise, in many applications, the cross sectional dimensions of the strip is important and strips having a high width to thickness ratio are required. A specific example of several uses in which strips of oriented polymers would be highly useful if it were not for the fibrillation and dimensional problems would be for use in straps required from baling and packaging, seat belts, belts of various types such as for ski tows, etc.

Accordingly, an object of this invention is to make thin sections of oriented polymeric materials having a high tensile strength in the orientation direction and superior strength normal to the orientation direction.

Another object is to make thin, high strength tapes of polymeric material in an oriented condition which have good strength characteristics transversely of the tape.

Still another object is to make such thin, oriented sections and tapes formed from shaped lengths of unoriented material which are drawn to a highly oriented condition exhibiting optimum strength characteristics and have a wide range of width to thickness ratios, particularly tapes having a high width to thickness ratio.

Yet another object is to provide methods of producing such thin, oriented sections and tapes from orientable polymers.

It had been discovered that oriented strips of polymeric materials which overcome the above discussed problems and meet the above listed objectives can be produced if, during the orientation stretching operation, the shaped unoriented length of material is drawn through a restricted passage which is narrower than the thickness to which the same extrusion would be drawn if stretched by freely drawing the material and extending it to its natural draw ratio. The new product of this invention is a highly oriented tape which has been stretched to the point where its resistance to further stretching rises markedly so that it exhibits a high tensile strength in the stretched direction. Although this new tape has a longitudinal strength in the direction of orientation only slightly less than tape produced by previous methods of being freely stretched and drawn to the natural draw ratio, its lateral strength is markedly higher than freely drawn tapes and the undesirable fibrillation and abrasive characteristics previously encountered in oriented tapes are markedly reduced. Furthermore, a highly oriented tape of excellent strength which has certain width to thickness ratios can be produced according to this invention in a much simpler and less expensive manner than by the usual method of orientation drawing by freely drawing the material.

In the drawings:

FIGURE 1 is a schematic view showing one embodiment of apparatus for producing oriented plastic tape in accordance with this invention.

FIGURE 2 is an elevation taken on section 2—2 of FIGURE 1.

FIGURE 3 is a schematic view showing a modification to the apparatus of the embodiment of FIGURE 1.

FIGURE 4 is an elevation taken on section 4—4 of FIGURE 3.

FIGURE 5 is a schematic view showing another embodiment of apparatus for practicing this invention.

FIGURE 6 is a schematic view showing still another embodiment of apparatus for practicing the invention.

In order to understand a process by which the subject of this invention may be produced and to indicate one typical embodiment of apparatus useful in carrying out the process of the invention, reference should be made to FIGURE 1. Raw material of an orientable polymer in chunk or particle form is fed into the hopper 11 of a conventional plasticizer-extruder machine 10. A conventional screw type plasticizer-extruder is schematically indicated in FIGURE 1 and includes a rotatable screw 12 extending concentrically along the longitudinal axis of the cylindrical barrel 13 of the extruder 10 such that the helical blades 14 of the screw are substantially flush with the inner walls of the barrel 13 so as to force the plasticized material 15 within the extruder 10 from the inlet end 16 to the outlet end 17. Controlled amounts of heat are applied to the raw plastic material within the extruder by suitable heating means such as electric coils 18 extending around the periphery of the extruder barrel 13. As a result of the externally applied heat, as well as that generated by internal friction as the screw 12 is rotated by a prime mover (not illustrated) connected to the end of the screw shaft 19, the solid material which is fed into the hopper 11 in the form of granules, is melted and changed to a semi-fluid or plastic, flowable state. The barrel 13 of the extruder at the outlet end 17 connects to the extruder die 20 having an orifice of suitable dimension such that hot plastic material 15, which is forced through the orifice by the high pressure generated within the extruder by rotating the screw (typically 1000–3000 p.s.i.), forms an extruded length 21 of unoriented material of a proper cross sectional size and shape to be drawn into an oriented tape of the desired size. For example, in order to produce an oriented tape measuring 0.5″ x 0.016″ an extruder orifice of rectangular cross section measuring 1.1″ x 0.09″ has been utilized.

The length of extruded unoriented plastic material 21 leaving the extruder die 20 is pulled away from the extruder, the direction being indicated by the arrows, by a conventional pulling means such as godet pulling rolls 22a and 22b around which the length of shaped material from the extruder is wrapped in several turns. A set of godet rolls usually comprises two rolls which are generally spaced apart vertically with one roll being smaller than the other and the axes of the rolls canted slightly in opposite directions so that the several wraps of tape tend to maintain their separation. The speed at which the godet rolls are rotated is such that the hot draw of the extruded length 21, as it leaves the die 20, is not great and the extrusion is hot drawn between a draw ratio of 1:1 to 1:1.5. In other words, the amount of hot draw performed in forming the extruded length 21 is of small magnitude. This hot drawing operation in producing the extruded length emerging from the extruder orifice will not cause any appreciable orientation of the material in the extruded length 21 since this is a hot drawing operation performed above the crystallizing temperature of the material.

The extruded length 21 of unoriented material, after leaving the extruder die 20, is pulled by the godet rolls through a quenching bath 23 contained in the receptacle 24 and maintained at that temperature found to produce the rate and degree of cooling which will result in the material having the proper degree and nature of crystallization for optimum orientation drawing characteristics. The quenching bath can be any suitable medium which cools the extrudate 21 on contact after it leaves the die 20, and may be water, ethylene glycol, or other suitable liquid, or may even take the form of cooling rolls discussed subsequently in another embodiment. It is believed that the rate at which the extruded, unoriented material is cooled affects the size and number of the crystallites formed in the material. Rapid cooling is thought to cause small crystallites and slow cooling large crystallites, with rapid cooling usually preferred because this produces a larger number of small crystallites, which are more easily oriented in the orientation draw. Obviously the size of the receptacle 24, the temperature of the quenching bath 23 and the duration of time the extruded unoriented length 21 is immersed in the quenching bath 23 are a function of the material being oriented, the type of crystallization desired in the material and the rate at which the extruded length 21 is produced.

The quenching bath fluid 23 is supplied through two inlet pipes 70 and 71 located at the extrusion strip entrance and exit areas of the receptacle and is drained through a drain line 72. Thus the quenching bath can be maintained at one temperature in that region 23a where the extruded strip enters the bath and at another temperature in that region 23b where the strip leaves the bath by supplying fluid at different temperatures in each of the supply lines 70 and 71. Freely rotating guide rollers 25, 26 and 27 are installed in the path which the extrusion 21 follows from the extruder die 20 through the quenching bath 23 to the powered, pulling godet rollers 22a and 22b to guide the extrusion 21 along the desired path. After leaving the godet rollers, the extruded length 21 of unoriented material is wound around a rotating storage spool 28. The means of rotating the pulling godet rollers and the storage spool 28 are not illustrated but can be any conventional means, such as a slip clutch arrangement, the linear speed of the extrusion on both rotating elements 22 and 28 being the same to avoid stretching the unoriented length 21 after it has been cooled to a crystallizing temperature.

So far the process is described is substantially the same as practiced in the well known prior art of preparing a shaped length of unoriented material for a conventional (two step) orientation drawing process. The unoriented extruded length 21 is stored on the storage spool 28 until required for the orientation drawing process. Referring to the right side of FIGURE 1, unoriented extruded material 21a of the desired shape, which is produced as described above and is wound on a supply spool 28a, is subjected to a longitudinal stretching force in an orientation drawing operation after being heated to the optimum temperature by being immersed in a reheat bath 29 contained in the vessel 30. The extruded length 21a is pulled off of the supply spool 28a which immersed in the reheat bath 29, over the guide rollers 32 and 33 and through a restricted passage 34 in a restraining die 35 by the rotating pulling godet rolls 36a and 36b in the direction indicated by the arrows. The arrangement of these godet rolls is similar to rolls 22a and 22b.

The reheat bath 29 is a suitable fluid such as water or ethylene glycol which heats the unoriented material of the extrusion 21a wound on the spool 28a to that temperature at which the orientation draw of material can be performed with optimum results. Although the material of the strip can be oriented at various temperatures below the crystallizing temperature of the material, there appears to be an optimum temperature at which the degree of orientation is maximum and the oriented material exhibits maximum strength characteristics. It is thought that this temperature is that at which the kinetic energy (heat) will encourage the crystallites to move relative to each other more easily in becoming oriented but not be sufficiently high as to destroy the crystallites by fusing them.

The pulling godet rolls 36a and 36b, around which the extruded material which has emerged from the reheat bath 29 is wrapped in several turns as indicated by the arrow alongside the godet, are rotated by a conventional powered rotating mechanism (not illustrated). The opening 34 in the restraining die 35 is considerably narrower than the thickness of the extruded strip 21a and provides a restraining force on the material opposing the pull being exerted by the godet rollers 36a and 36b. Thus the material in the extruded strip 21a is subjected to stretching forces exerted by the die and the godet rollers, respectively. This stretching force will cause the crystallites in the material to become aligned in the direction of the stretching force, the extruded material 21a will be elongated and assume a highly oriented condition. However, due to the critically narrow die opening, the restraining die 35 applies forces to the extruded material other than a force directly opposing the pull of the godet rollers. Therefore, although a stretching force is applied to the extrusion 21a, the operation is not that of freely drawing the unoriented material without restraint as practiced in the prior art, since the narrower dimension, or width, of the die opening 34 is less than the thickness which the shaped extrusion 21a would assume on being freely drawn and stretched at its natural draw ratio to a fully oriented condition. Due to the alteration of the orientation drawing phenomenon imposed by the restraining die, the thickness of the orifice drawn oriented tape of this invention is less than the thickness which the extruded length 21a would assume had it been stretched and freely drawn at its natural draw ratio without any external confinement or restraint.

Referring to FIGURE 2 in conjunction with FIGURE 1, the restraining die 35 has a bell or funnel entry 34a leading to the long and narrow opening 34 in which the narrow dimension is defined by closely spaced parallel walls. The configuration illustrated in FIG. 2 is one in which the width of the opening defined by the closely spaced parallel sides will produce a flat tape; however, the opposing sides of the slot 34 could be curved or shaped in any desired form to produce a tape of various shapes if such were desired. The restraining die 35, illustrated in FIGURE 2, is a split die comprising two heavy plates 35a and 35b which are securely held together by the fasteners or bolts 49. The plates and fasteners must be sufficiently strong and heavy to withstand the drawing forces involved. The width, or narrow dimension, of the restricted passage 34 in the die 35 is critical and the spacing between the opposing surfaces of the die plates 35a and 35b must be precisely adjustable to approximately a half mil or less. The narrow dimension of the restricted passage 34 must be less than the thickness to which the extruded length of material 21a would be drawn had it been freely drawn at its natural draw ratio to a highly oriented condition by the pulling godets without the alteration on the orientation phenomenon caused by the restraining die. Therefore, the material of the die drawn oriented tape assumes a smaller minimum cross sectional dimension than the orientation stretching force alone would produce. In other words, the natural draw ratio and the cross sectional dimensions of the undrawn extruded material 21a are such that freely drawing this extruded length 21a to a fully oriented condition without passing it through any restricting passage will produce a highly oriented, fully stretched product which is somewhat thicker than the width of the die opening 34. For example, an extruded length of unoriented polyethylene measuring 0.8" x .090" in cross section is reduced to a cross sectional dimension of .267" x .030" when freely drawn to a fully oriented condition. If this same extrusion were to be used in producing an oriented tape in accordance with the teachings of this invention, the width of the constricted passage 34 through which the extrusion is drawn in the orientation process must be less than .030"; e.g., the die opening might be .025" wide, might be .020" wide or other dimension less than .030". The long dimension or length of the narrow opening 34 in the restraining die 35 is not critical and need only be sufficiently wide to accommodate that width which the material 37 assumes in passing through restraining die opening 34. It has been the practice to make the breadth of the die opening 34 somewhat larger than the width of the tape passing through it, as illustrated in FIG. 2 since the tape will assume a constant width unaffected by extra breadth of the die opening.

Thus, the relatively thick extruded length 21a of unoriented tape is drawn and stretched to a thin, narrow length of oriented tape 38 by the combined effects of the pull applied by the godet rolls and the peculiar restraining effect of the critically narrow die opening. The fully stretched and die drawn highly oriented tape 38, which is wound around the godet rolls 36a and 36b in several turns is wound onto a storage spool 39 after leaving the godet rolls. The storage spool 39 for the oriented tape, like the storage spool 28 on which the unoriented length of tape was wound, may be powered by a suitable means (not illustrated) so that the tape being wound on the storage spool and the periphery of the pulling godet move at substantially the same speed.

Since the unoriented extruded material is stretched up to approximately 12 times its original length in being fully drawn, the speed of the godet rolls must be controlled to establish the necessary drawing tension which will fully stretch the extrusion to an oriented condition but will not induce a breakage stress in the fully stretched material. The force necessary to draw the unoriented material to the oriented condition is not great, but once the material has been drawn to its fully oriented condition, the resistance of the material to being further stretched rises markedly. Therefore a conventional speed control arrangement may be used in conjunction with a prime mover to rotate the godet rollers 36a and 36b at rotational speeds which will fully stretch the material being restrained by the die but not break it.

In order to maintain the extruded material at an ideal temperature for the orientation draw after it leaves the reheat bath 29, the walls of the restraining die 35 are heated by suitable means such as electrical heating coils 40 installed on the restraining die 35. The desired temperature can be maintained by a suitable automatic temperature sensing control which regulates the power to the electrical heating coils 40. It has been found advantageous to maintain the restraining die 35 at about the same temperature as the reheat bath 29.

The oriented tape 38, which is produced by pulling the undrawn material through a restraining die, is thinner and wider than if the restraining die were not utilized. The longitudinal tensile strength of the oriented tape which is produced by this invention is only slightly less than that of tape which is produced by the conventional method of being freely drawn. However, the lateral strength of the tape produced by this invention is markedly greater than that of oriented tape produced by conventional methods. A possible explanation of this result is that the restraining die forces the axes of some of the crystallites to lie more transversely to the length of the tape than they would were it not for the restraining die. The normal free draw orientation pattern of the crystallites is apparently upset by the restraining effect of the narrow die opening and some of the crystallites which would slide into substantial alignment with the stretching force are forced down into the plane of the die slot while remaining in their initial alignment position of being lateral to the drawing force. Thus the crystallite orientation pattern of the fully stretched die orientation drawn tape is apparently not the same as obtained by the usual orientation process of freely drawing the material at its natural draw ratio. The critically narrow die apparently alters the usual, normal orientation pattern. The die oriented material, although completely stretched and highly oriented, is not drawn at its natural draw ratio and has properties not usually attributable to oriented material. The above reasoning is hypothetical as these theories have not been verified by X-ray photography or extensive analysis.

The constricted passage through which the plastic material is pulled while undergoing the orientation draw need not be the conventional stationary split die discussed above relative to the embodiment of FIG. 1, but can be any means of forming a restricted or confined passage of the required dimensions. FIGURES 3 and 4 illustrate another form which this confined passage can take. FIGURE 3 is substantially the same as that segment of FIGURE 1 to the right of the guide rollers 32 and 33 but with the restraining die 35 replaced by a set of nip rolls 41 and 42. Each of these two rolls, as indicated in FIGURE 4, has a central section, 43 and 44 respectively, having a reduced diameter. Thus, when the rolls are placed together, a narrow passage 45 is formed between the central sections of the two rolls. The nip rolls 41 and 42 are each rotatably supported at the ends by an axle 46 mounted in a bearing 47 so that the rolls 41 and 42 are free to rotate. Suitable heating means are provided within the rolls, such as electrical heating coils 48 controllably connected to a power supply to maintain the roll surface at the drawing temperature. Thus, the nip rolls provide what amounts to a confined passage similar to the restraining die but having moving walls. The same requirement relating to the dimensions of the opening 45 between the two nip rolls 41 and 42 applies as discussed above relative to the opening 34 in the restraining die 35, whereby the plastic material 37 of the extrusion in being pulled between the center opening between the rolls is drawn to a thinner cross section than would occur had the material been freely drawn at its natural draw ratio by the godet rolls 36a and 36b without the added effect of the confined passage.

FIGURES 5 and 6 illustrate two embodiments wherein the extruded length of unoriented material is drawn to a fully oriented tape in a continuous process without the interruption of being stored on the storage spool 28a, as described above relative to the embodiments of FIGS. 1–4. Referring specifically to the embodiment of FIGURE 5, a shaped length of unoriented material 51 is extruded from the die 52 of the extruder 50 in the same manner as discussed in producing the extruded length 21 of FIGURE 1. The extruded length 51 of unoriented material has a cross sectional dimension appropriate to the final oriented tape having the desired dimensions. After emerging from extruder die 52 the unoriented extruded length 51 is immersed in a bath 53 contained in a receptacle 54 wherein the bath 53 fulfills the functions of both the quenching bath 23 and the reheat bath 29 of FIGURE 1. The temperature of various portions of the bath 53 and the duration of time in which the extruded length is immersed in the bath is such as will cause the unoriented crystalline material to be at an optimum temperature for being orientation drawn. One bath is illustrated in FIG. 5 but the container 54 can have several compartments and the temperature of the liquids in each compartment may be different so that the equivalent of the separate quenching and reheat baths of FIG. 1 is produced. The extruded length 51, after passing through the quenching bath 53, is pulled through the restraining die 55 by the pulling godet rollers 56a and 56b in the same manner that the extruded length 21a is pulled through the restraining die 35 by the pulling godets 36a and 36b in FIGURE 1. The restraining die 55 has heating coils 57 to maintain the die at the proper draw temperature as discussed for the die 35 in FIG. 1. The fully drawn, thin tape 58 is wound around the storage spool 59 after it leaves the pulling godets, around which the oriented tape 58 is wound in several turns to provide a pulling bight for application of the drawing tension. In other words, the apparatus of FIGURE 5 is essentially the same as that of FIGURE 1 except that the quench bath 23 and reheat bath 29 are combined or placed in immediate sequence and the apparatus in the left hand section of FIGURE 1 following the quench bath 23 are eliminated.

FIGURE 6 illustrates another embodiment of apparatus for performing a continuous draw process similar to FIGURE 5; but in FIGURE 6 the means of cooling the unoriented extruded material after it leaves the extruder and bringing it to the proper temperature for the orientation draw are different than in FIGURE 5, and nip rolls are utilized in lieu of a fixed restraining die. After the extruded length 51 emerges from the extruder die 52, instead of immersing the extruded length in a bath 53 as in the embodiment of FIGURE 5, the extruded length passes around the exterior walls of the cooling rolls 60 and 61. These cooling rolls 60 and 61 are free to rotate about their longitudinal axes so that the extrusion and rolls are in intimate rolling contact and the rolls are maintained at the proper temperature by a circulating cooling medium 62. The unoriented extruded length 51 is cooled by its contact with the cooling rolls 60 and 61 to a temperature at which the material is in a crystalline form and at an optimum temperature for being drawn to an oriented condition. One or more heat exchanging rolls may be used (two are illustrated in FIG. 6), and they may be at the same or different temperatures. The extruded length of unoriented material is pulled by the godet rollers 56a and 56b through the confined passage or opening formed between the nip rolls 63 and 64 in the same manner as discussed relative to the embodiment of FIGURE 3. The nip rolls 63 and 64 are substantially the same as nip rolls 41 and 42 of FIGURES 3 and 4, are heated, and form a confined passage between the central portion of the rolls through which the extruded length 51 of unoriented material is drawn to a thin tape 58 of oriented material which is stored on the spool 59. The width of the oriented tape can be substantial. Therefore, it is visualized that wide tapes can be slit into multiple tapes of narrower widths by installing a rotary shear 65 between the pulling godet rollers and the storage spool 59, as illustrated in FIG. 6. Obviously a slitter could be utilized with the other illustrated embodiments if desired.

It should be clearly understood that the cooling rolls 60 and 61 do not necessarily have to be utilized with the other elements of the embodiment as indicated in FIGURE 6 but could be substituted for either or both the quench bath 23 of FIGURE 1 or the reheat bath 29 of FIGURE 1. Likewise it is not necessary that nip rolls be utilized in lieu of a restraining die where indicated in each of the figures, the nip roll and the restraining die being mutually interchangeable. Likewise it should be clearly understood that the apparatus described and illustrated in the embodiments of FIGURES 1 thru 6 are purely schematic and that many substitutions and refinements in the apparatus are contemplated.

As indicated previously, a number of polymers can be drawn into an oriented condition. One of these polymers, which has been successfully utilized by the applicant in his new process for producing a superior oriented tape, is Marlex 5003 supplied by the Phillips Chemical Company. This material is a linear copolymer of polyethylene and butylene. Oriented, thin tapes of various sizes were produced by processing Marlex 5003 in accordance with the invention described above and these tapes exhibited a high longitudinal tensile strength along with a superior resistance to fibrillation and abrasion. Data concerning two sizes of oriented tapes made in accordance with this invention are tabulated below as representative of the inventive products produced by the teachings of this disclosure. Table I indicates the conditions under which the indicated extruded length of unoriented material was produced. Table II indicates the conditions and results obtained by freely drawing the unoriented, extruded length of material indicated in Table I at its natural draw ratio carried out in the manner in the prior art. Table III indicates the condition and results attained by making the orientation draw of the same material indicated in Table I through a confined passage which was narrower than the thickness of the fully oriented tape which was produced by being freely drawn at its natural draw ratio under the conditions indicated in Table II.

TABLE I.—EXTRUSION OF MARLEX 5003 TO SHAPED LENGTH

| | Sample A | Sample B |
|---|---|---|
| Extruder Pressure | 1,000 to 3,000 p.s.i | 1,000 to 3,000 p.s.i. |
| Extruder die size | 1.10″ x 0.09″ | 1.00″ x 0.10″. |
| Melt Temperature | 330°–340° F | 330°–340° F. |
| Hot draw ratio | 1.4:1 | 1.45:1. |
| Unoriented extrusion size | 0.80″ x 0.09″ | 0.75″ x 0.105″. |
| Quench bath temp.[1] | Entrance 130° F.; Exit 170° F. | Entrance 130° F.; Exit 170° F. |
| Quench time [1] | 15 to 20 seconds | 15 to 20 seconds. |

[1] A function of speed.

TABLE II.—FREE, UNRESTRAINED DRAW OF EXTRUSION TO ORIENTED CONDITION

| | Sample A | Sample B |
|---|---|---|
| Reheat bath temp | 240° F | 240° F. |
| Draw Ratio [1] | 9:1 | 10.55:1. |
| Oriented Tape size | 0.267″ x 0.030″ | 0.220″ x 0.032″. |
| Longitudinal strength of tape | 5.5 grams/denier | 5.8 grams/denier. |
| Resistance to fibrillation | low | low. |

[1] See footnote 1, Table III.

TABLE III.—DIE DRAWINGS OF EXTRUSION TO ORIENTED CONDITION

| | Sample A | Sample B |
|---|---|---|
| Reheat bath temp | 240° F | 240° F. |
| Draw Ratio [1] | 9:1 | 10:1. |
| Restraining die size (narrow dimension) | 0.025″ | 0.022″. |
| Oriented tape size | 0.500″ x 0.016″ | 0.452″ x 0.016″. |
| Longitudinal strength of tape | 5.2 grams/denier | 5.05 grams/denier. |
| Resistance to fibrillation | high | high. |

[1] Draw ratio is defined as ratio of cross sectional area of material prior to draw and after draw, determinable by measuring dimensions or weighing equal lengths.

In processing Marlex 5003, a melt and extrusion temperature of 330° to 340° F. appears to be optimum. When the temperature of the extruded material was raised to 400° F. the tensile strength of a freely drawn oriented tape was reduced to 4 grams/denier, whereas an extrusion temperature of 350° F. yielded a freely-drawn oriented tape having a tensile strength of 5.5 grams/denier. Likewise, holding the hot draw performed on the unoriented extruded length to less than 1.5:1 appeared to be beneficial. An extrusion which was hot drawn to 1.25:1 yielded an oriented freely drawn tape having a tensile strength of 4.8–5.6 grams per denier. On the other hand if the extruded length were subjected to a hot draw of 2:1 an oriented freely drawn tape was produced having a tensile strength of 2.8–4.3 grams per denier. Although the results quoted above relate to a freely drawn tape which was subjected to an orientation draw in accordance with the prior art, they are representative of the same effects on tapes produced by the practice of this invention.

One specific object of the applicant, while investigating the gamut of strengths attainable in various sizes of oriented tapes, was to provide an oriented plastic tape having a tensile strength exceeding 5 grams/denier and approaching 5.5 grams/denier which was ½″ wide and 16 mils thick and would not crack laterally across the width of the tape when high loads were applied. Marlex 5003 material when processed in accordance with this invention produced such a tape in Sample A. This tape would be most useful as straps for baling or packaging to replace steel straps and the like. Obviously tape of the characteristics attained in this process and of various sizes and thicknesses would be useful in many other applications.

Although these conditions and results tabulated above pertain to Marlex 5003, other orientable polymers may be utilized to practice this invention and, of course, the exact conditions indicated in Tables I, II, and III would not necessarily hold for these materials. However, the proper melt temperature, optimum quenching and drawing temperatures, etc. are known or easily found by experimentation for the various orientable polymers, and if combined with the teachings of this invention outlined above and as herein claimed, highly superior oriented tapes may be fabricated. Although Marlex 5003 has been found to be a highly satisfactory polymer for practicing this invention, other polymers, including polypropylenes, would be suitable materials; although some would be better than others as they vary in melt index, molecular size, lateral interlinkage of molecules, etc.

While the above matter describes and illustrates preferred embodiments for making thin, oriented plastic strips and tapes having a high strength transverse to the orientation direction, it should be understood that the invention is not restricted solely to described embodiments but that it covers all modifications which would be apparent to one skilled in the art and which would fall within the spirit and scope of the invention.

What is claimed is:

1. In the process of producing a thin, flat tape of oriented polymeric material by applying a stretching force to an extruded length of orientable polymeric material having an elongated cross section to draw the extruded length to a permanently elongated length of oriented material of reduced cross section, the improvement of heating the extruded length to an orientation temperature immediately below the crystallizing temperature of said material and pulling said reheated, extruded length through a confined passage by means of the stretching force in forming the elongated, oriented length and maintaining the walls of said confined passage at approximately that of said orientation temperature, said passage having two parallel walls spaced apart less than the thickness assumed by the extruded length when freely drawn at its natural draw ratio by a stretching force.

2. The improvement in the process of claim 1 wherein the polymeric material is linear polyethylene.

3. The improvement in the process of claim 1 wherein the polymeric material is polypropylene.

4. The process of fabricating an oriented tape of orientable polymeric material, comprising the steps of forming the polymeric material into a shaped length of elongated cross section at a temperature at which crystallites are formed and the material is orientable, heating said length to that temperature at which the crystalline structure is optimum for assuming an oriented condition, and pulling said heated length through a confined passage and stretching it to a permanently elongated length of oriented material by applying a stretching force to the pulling end of said segment, said confined passage having an elongated cross section in which the maximum cross sectional dimension is greater than the width of the oriented tape and the minimum cross sectional dimension is defined by opposing walls spaced apart less than the thickness of said shaped length when freely drawn at its natural ratio by a stretching force.

5. The process of claim 4 wherein said shaped segment is formed by heating a mass of the polymeric material above its melting point, forcing the molten material through an extruding die to produce a hot, shaped extruded length of material, and cooling said hot, shaped length to a temperature at which crystallites of an orientable nature are formed in the material.

6. The process of claim 5 wherein the cross sectional area of said hot extruded length is reduced by less than 50% by hot drawing before being cooled.

7. The process of claim 5 wherein said material is linear polyethylene, said hot, extruded length from the extruder is cooled to a temperature not exceeding 170° F., and said optimum orienting temperature of the material in the extruded length being pulled through said passage does not exceed 260° F.

8. The process of claim 7 wherein said molten material is maintained at a temperature between 340° F. and 360° F., the hot draw reduction in cross section of the hot extruded length is between 20 and 40 percent, said temperature to which said hot extruded length is cooled is between 130° F. and 170° F., said optimum orienting temperature for the material being pulled through said confined passage is between 230° F. and 260° F. and a cooled, extruded length of said polyethylene material at said optimum orienting temperature will elongate to a natural draw ratio between 8 and 11.

References Cited by the Examiner
UNITED STATES PATENTS

| | | |
|---|---|---|
| 2,291,873 | 8/1942 | Brubaker. |
| 2,517,694 | 8/1950 | Merion et al. _____ 28—82 |
| 2,715,763 | 8/1955 | Marley _____ 28—82 |
| 2,767,429 | 10/1956 | McCrosky. |
| 2,867,848 | 1/1959 | McGlamery _____ 264—210 |
| 2,874,410 | 2/1959 | Kinney. |
| 2,985,503 | 5/1961 | Becker. |
| 2,995,779 | 8/1961 | Winter _____ 264—289 XR |
| 3,107,139 | 10/1963 | Witherington et al. ___ 264—289 |

FOREIGN PATENTS

| | | |
|---|---|---|
| 561,337 | 8/1958 | Canada. |
| 687,544 | 5/1964 | Canada. |

ROBERT F. WHITE, *Primary Examiner*.

MORRIS LIEBMAN, ALEXANDER H. BRODMERKEL, *Examiners*.

C. B. HAMBURG, J. R. DUNCAN, M. R. DOWLING, *Assistant Examiners*.